(12) United States Patent
von Haas

(10) Patent No.: US 6,213,231 B1
(45) Date of Patent: Apr. 10, 2001

(54) BORING TOOL WITH RECTANGULAR PLATES

(75) Inventor: Rainer von Haas, Hamburg (DE)

(73) Assignee: Walter AG (DE)

( * ) Notice: Subject to any disclaimer, the term of this patent is extended or adjusted under 35 U.S.C. 154(b) by 0 days.

(21) Appl. No.: 09/105,484

(22) Filed: Jun. 26, 1998

(30) Foreign Application Priority Data

Jun. 26, 1997 (DE) .............................................. 197 27 170

(51) Int. Cl.$^7$ ...................................................... E21B 10/44
(52) U.S. Cl. .......................... 175/394; 175/401; 175/413; 175/399
(58) Field of Search .................................. 175/394, 398, 175/399, 401, 413, 420.1, 426

(56) References Cited

U.S. PATENT DOCUMENTS

| | | | |
|---|---|---|---|
| 2,891,429 | * | 6/1959 | Tragge . |
| 4,595,322 | * | 6/1986 | Clement ........................... 175/394 X |
| 5,176,477 | | 1/1993 | Noggle ..................................... 408/59 |

FOREIGN PATENT DOCUMENTS

| | | |
|---|---|---|
| 28 43 788 | 5/1979 | (DE) . |
| 40 18 043 | 12/1991 | (DE) . |
| 94 07 575 | 10/1994 | (DE) . |
| 0 066 079 | 4/1982 | (EP) . |
| WO93/02824 | 1/1993 | (WO) . |

* cited by examiner

*Primary Examiner*—Roger Schoeppel
(74) *Attorney, Agent, or Firm*—Leydig, Voit & Mayer, Ltd.

(57) ABSTRACT

A boring tool is provided with first and second rectangular reversing cut plates which have, in each case, two short and two considerably longer cutting edges. One of the reversing cut plates is arranged connecting to or intersecting the axis of rotation of the boring tool, while the other reversing cut plate 12 is arranged connecting to the outer circle defined by the boring tool. The cutting edges active in each case on the face side of the boring tool have a straight construction and they overlap to a greater or lesser extend, in accordance with the bore diameter. The bend-free and jog-free construction of the active cutting edges of the cut plates makes possible the use of the same reversing cut plates on boring tools having different diameters with only the extent of the overlap of the cut plates being changed.

17 Claims, 10 Drawing Sheets

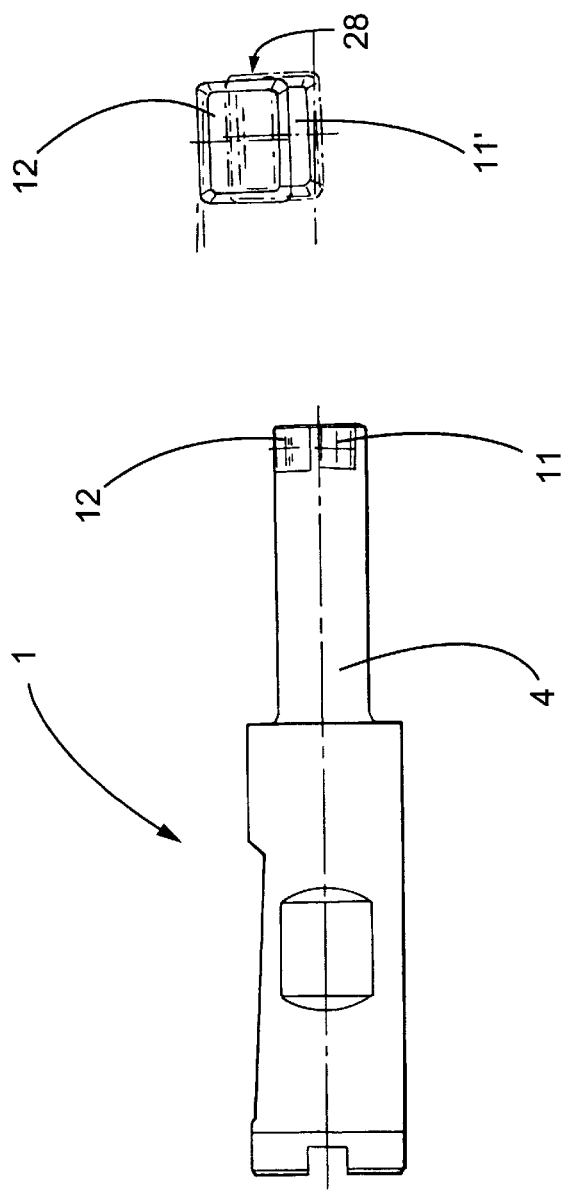
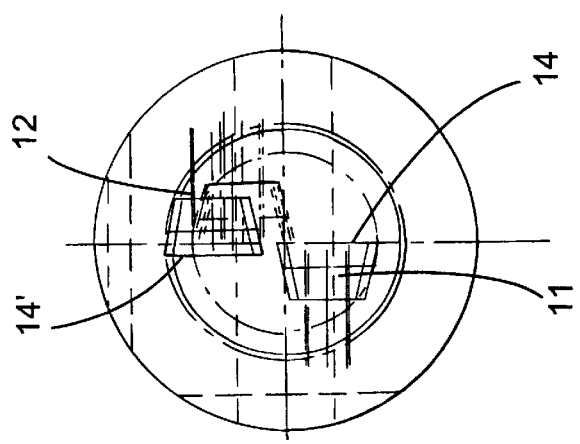
Fig. 3

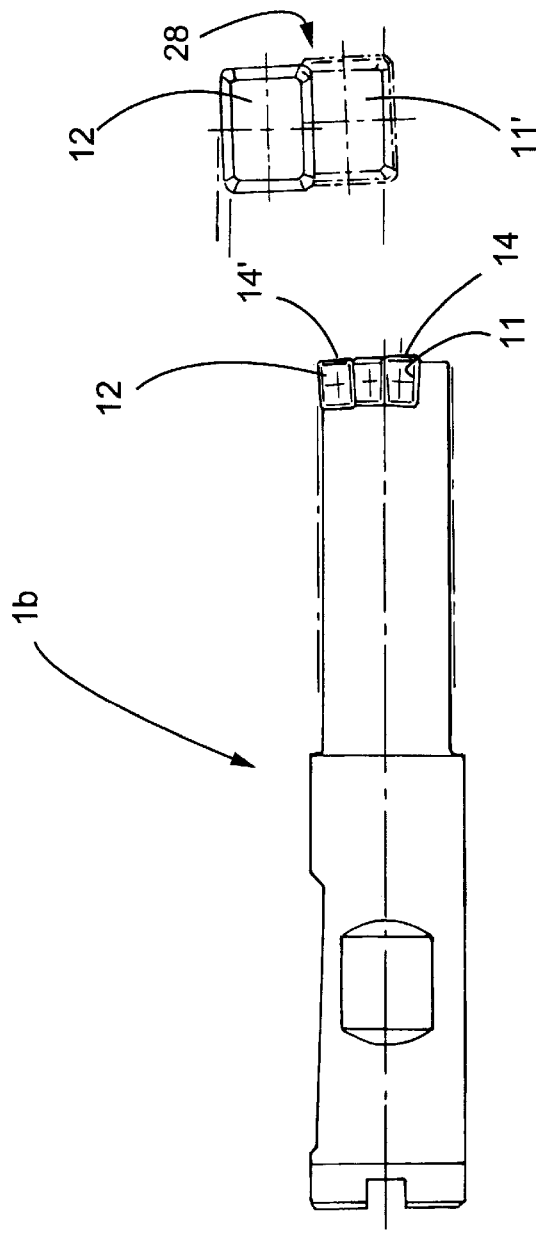
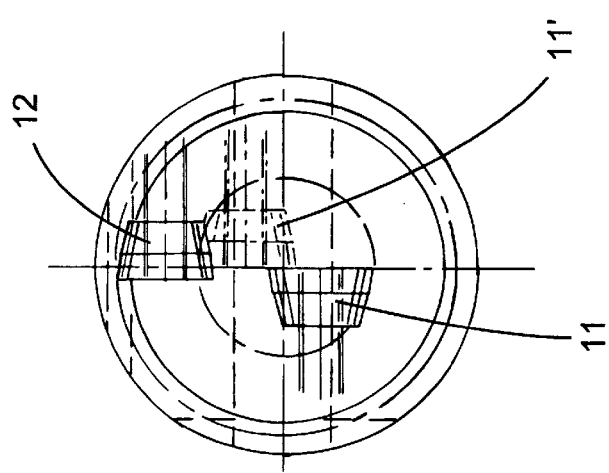
Fig. 5

BORING TOOL WITH RECTANGULAR PLATES

FIELD OF THE INVENTION

This invention generally relates to boring tools and, more particularly, to a reversing cut plate equipped boring tool.

BACKGROUND OF THE INVENTION

A reversing cut plate-equipped boring tool is described, for example, in EP 0 750 960 A1. This boring tool has a borer body which has a shaft arranged for fastening to a corresponding chuck on one end and two plate seats on its other end. On the plate seats there are held essentially square reversing cutting or cut plates each having four cutting edges which are constructed. The cutting edges are bent slightly concave in order to smooth the bore wall definitively with a side blade, which engages the bore wall solely with a corner or a short section.

The two reversing cut plates held on the face side of the boring tool in corresponding plate seats overlap reciprocally on the tool face. With this arrangement, in particular, the sections of the cutting edges following upon the corner blades act with a shaving removing effect. The exact relations of the two reversing cut-plates are dependent on the borer diameter and, accordingly, on the extent to which the reversing cut plates overlap. Furthermore, with square reversing cut plates of a given size, more than two reversing cut plates are required if the borer radius is greater than twice the edge length of one reversing cut plate.

Boring tools with reversing cut plates are also known from WO 93/02824. This boring tool has a borer body with two face-side plate seats on which there are held rotating cut plates essentially rectangular in shape. Specifically, on the rotating cut plate there are formed two shorter concavely curved cutting edges lying opposite one another, which over an arcuately curved projecting corner blade extend into similarly concave-constructed longer flanks which do not function as a cutting edge. The reversing cut plates are thus attuned in their size to the borer diameter in such manner that the radially farther outside positioned reversing cut plate stands with its inside-lying corner blade approximately in the area of the middle of the cutting edge of the reversing cut plate arranged radially inside. Therefore, the machining is concentrated mainly in the areas near the corner of each cutting edge, whereas the middle sections are largely unburdened.

A boring tool with triangular cutting plates is known from DE 4018043 A1. With this boring tool each cutting edge is constructed either arcuately convex or with a corresponding jog. With corresponding overlapping of several cutting edges on the reversing cut plates provided on the borer face side, a blade extending in a corrugated or in zig-zag manner is produced. The radially inside-arranged cutting plate extends with its corner edge somewhat beyond the axis of rotation. The point lying furthest forward axially, however, forms approximately the middle of the cutting edge of this reversing cut plate. This point lies at a relatively great distance from the axis of rotation. This can result in problems when starting a boring operation. Furthermore, the use of the same reversing cut plates on boring tools having different diameters can lead to different amount of overlapping of the reversing cut plates. As a result of their convexly curved or convexly bent geometry, the edges of the reversing cut plates come into engagement with the work piece in ever shorter sections which can lead to non-uniform stresses on the cut plates and the boring tool.

As general rule, cutting plates are designed for the borer, i.e. for the basic tool, for which they are provided. Thus, for different tool diameters, for right-spiral tools and for the left-spiral tools different cutting plates must be provided. As will be appreciated, this presents a significant economic burden.

Furthermore, in many boring tools, the cutting plates are set in such a way that during the machining process a radial force is produced which deflects the basic tool body in a radial direction. This leads to an increase of the bore diameter, which is otherwise dependent on the length of the tool, on the turning rate of the tool, and on the material removed.

OBJECTS AND SUMMARY OF THE INVENTION

Accordingly, in view of the foregoing it is an general object of the present invention to provide a boring tool which can be used economically and provides good processing quality.

An additional object of the present invention is to provide a boring tool as characterized above which enables reversing cut plates to be used when the boring tool has a relatively small diameter.

A further object of the invention is to provide a boring tool of the foregoing type which has an improved useful life regardless of the diameter of the boring tool.

Still another object of the present is to provide a set of boring tools which can utilize the same reversing cut plates.

The present invention provides these and other advantages and overcomes the drawbacks of the prior art by providing a boring tool which has at least one, but preferably two rectangular plates, which have in each case a total of four edges. The two cutting edges lying opposite one another, of which one is active, i.e. is arranged on the face side of the borer, are entirely straight, i.e. constructed without curvature or jog. Active cutting edges are formed by the shorter and/or longer cutting edges of the rectangular plate, these active cutting edges are arranged approximately perpendicular to the longitudinal axis or axis of rotation of the borer. Alternatively, the cutting edges may also be slightly inclined with respect to the rotational axis of the borer.

In addition, the longer edges are preferably constructed completely straight, i.e. without jog or bend. The combination of a long straight cutting edge and with a short straight cutting edge permits the reversing cut plate to be selectively installed lengthwise or transversely in order to sweep a greater diameter range.

If the two longer cutting edges are used, an even greater sweeping of the diameter ranges of a reversing cut plate size is achieved. Through the straight construction of the overlapping cutting edges it is possible, with corresponding arrangement of the active cutting edges in the borer body, to achieve the result that independent of the extent to which the two reversing cut plates held on the borer overlap, i.e. independent of the borer diameter, the two active cutting edges are able to come into engagement over their entire length with the material of the work piece and accordingly act to remove the material. This increases the useful life of the boring tool. This advantage applies for both rectangular and also for slightly rhombic reversing cut plates.

Preferably, however, the reversing cut plates are constructed rectangular, i.e. in each case having a long and a short straight-constructed cutting edge which are connected to one another at a corner at a right angle. Reversing cut plates having such a configuration are particularly stable. Additionally, such reversing cut plates enable an improved distribution of the forces onto the plate seat and an increased spacing between the thread bore and the corner of the borer body. Thus, the danger of breakage of the borer body is reduced. Through the axially longer plate there is yielded a lower surface force and an improved reduction of non-uniform load distributions.

The rectangular cutting plates also can be used with both right-spiral and left-spiral tools, which can belong to one tool set. It is thus possible for many diameters and many tool types (i.e., right and left spiral) to utilize one cutting plate construction and size.

The reversing cut plate is preferably held by means of a fastening screw which grips through the reversing cut plate centrally at a fastening bore.

The two reversing cut plates of a borer tool are preferably arranged in different radial positions. In this arrangement one cutting plate connects to the outer circle of the boring tool and defines the latter, while the other reversing cut plate connects to the axis of rotation. The cutting relations of the reversing cut plates are essentially the same, independent of the borer diameter. In particular, only the extent of the overlapping of the two reversing cut plates changes when borer bodies of different diameter are equipped with the same reversing cut plates.

The two reversing cut plates of the boring tool are preferably set at a 180° angle to one another with the radially inwardly positioned reversing cut plate being arranged farther forward than the radially outwardly positioned reversing cut plate. Thus, the cutting force on the inner cutting plate is greater than the cutting force on the outer reversing cut plate. The cutting forces which are produced are directed at approximately a right angle to the particular cutting edge. Since the radial force of the inner reversing cut plate is greater, the borer body of the boring tool is subjected to a defined, however, not very substantial radial force, which produces only a slight flexible deflection of the borer body to the outside and thus only to a slight increase of the boring diameter. Furthermore, the defined radial force leads to a stabilization of the borer against vibrations. Stabilization against vibrations is also achieved when the rigidity of the borer body is quite substantial with the resulting deflection of the borer body being relatively small. The high rigidity of the borer body is preferably achieved by leading the tension grooves only over 45° in a partial spiral-like manner around the borer body.

The resulting radial force, however, is not so great that a substantial diameter enlargement of the bore could develop. This is this is the case particularly if the cutting plates are adjusted in such manner that they first touch the work piece with their cutting edges at a point lying near the axis of rotation of the boring tool. The resulting radial forces are, as required, not zero, but still are so slight that the tool generates precisely the desired diameter bore.

The circumferential cutting edges of the cutting plates are preferably inclined so that they enclose an acute angle with the axis of rotation and the generated bore wall. This prevents the circumferential blades from scraping on the bore wall.

The boring tool is also preferably constructed so that the inner reversing cut plate lies with its inside-lying corner edge at the axis of rotation. Preferably, the axis of rotation extends approximately centrally past the corner edge, or alternatively the axis of rotation cuts across this edge.

Through a slight tilting of the reversing cut plate with respect to the axis of rotation, the point lying axially the farthest forward of the transition between the active main edge and the corner edge can be arranged such that it lies directly at the axis of rotation. Thus, in the middle area of the borer middle defined material removal relations are achieved. Moreover, a pressing of the borer in the area of the axis of rotation is avoided and during the boring operation a thin pin or needle of material which is not bored away temporarily remains standing, particularly when the resulting radial force minimally deflects the borer body. This middle pin of material that remains standing is continuously broken off during the boring by the chips or is sheared off, at the latest, when the borer body returns from into a non-deflected position from the deflected position which is produced by the radial force. This can be achieved when the transition point between the corner cut and the main cut lies farther forward axially than the corner edge. In particular, however, this is achieved when this transition point is the point lying entirely farthest forward axially.

The arrangement of the cutting plates on the boring tool also prevents a reversal of the direction of the total cutting force at the beginning of the boring process and during the machining of the entire bore. In particular, the forces produced by the machining in the area of the axis of rotation are directed approximately in the same manner as on the other cutting edge. Accordingly, excess wear is avoided.

As noted above, the rectangular reversing cut plates on the boring tools also enable a considerably wider diameter range as compared two square plates. For example, with a tool set having several borer bodies for different borer diameters, under some circumstances the borers can be fitted with a single type of reversing cut plates. This can be accomplished if the reversing cut plates are installed lengthwise in the borer bodies having smaller diameters, and are installed transversely in the borer bodies having larger diameters. This means that with the boring tools having smaller diameters, the short cutting edges of the reversing cut plates form the active cutting edges. Fine graduations of the borer diameters can be brought about through varying the extent to which the reversing cut plates overlap. The cutting or material-removal relations, through the engagement of the reversing cut plates with the work piece, are similar over their entire cutting edge length.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 3 is a schematic side elevation of the illustrative boring tool further including a schematic projection of the cut plates and a schematic front elevation of the face of the boring tool.

FIG. 5 is a schematic side elevation, cut plate projection and front elevation similar to FIG. 3 of a boring tool having a relatively larger diameter than the boring tool shown in FIG. 4.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
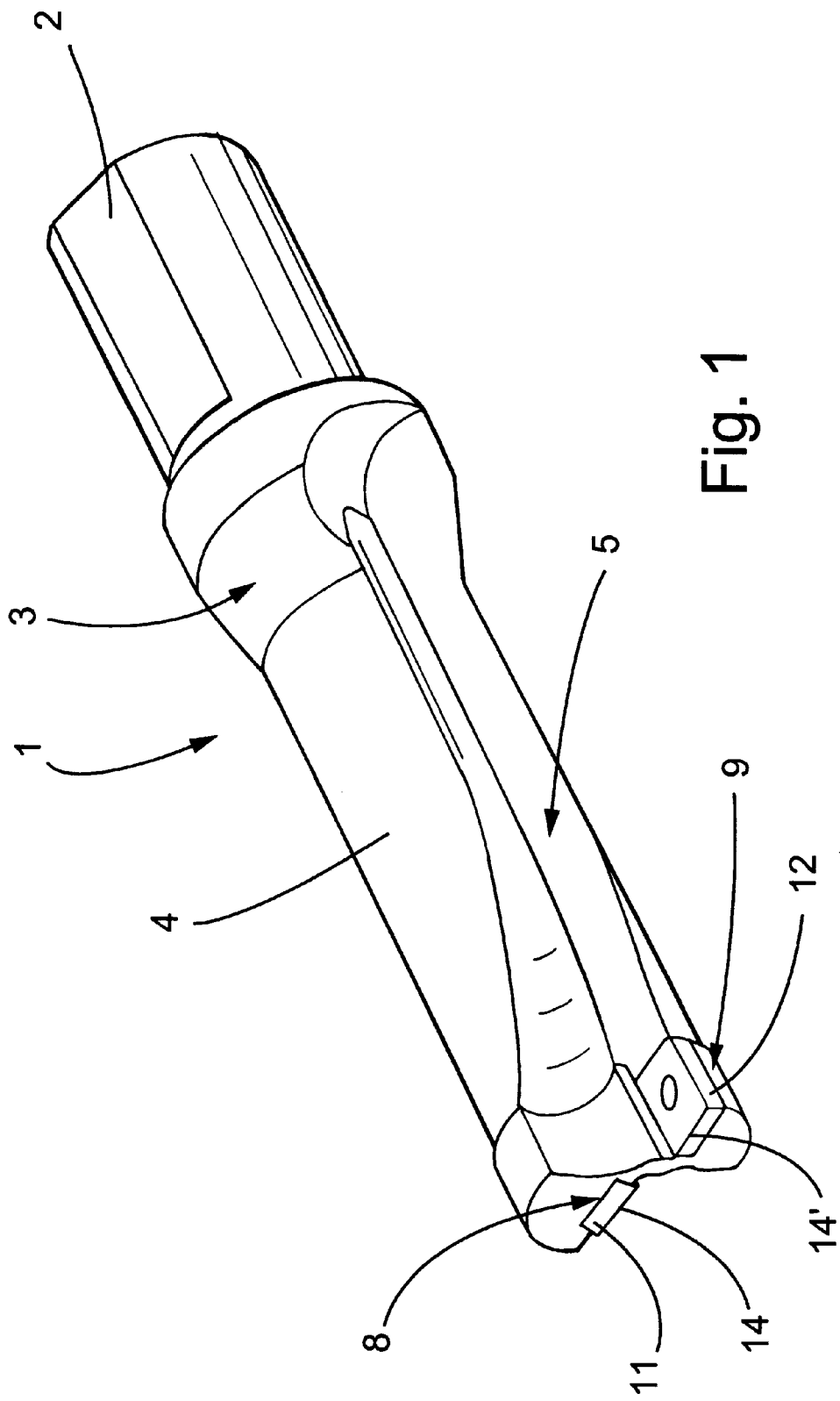
FIG. 1 is schematic perspective view of an illustrative boring tool having a rectangular reversing cut plate according to the invention.

Referring now more particularly to FIG. 1 there is shown an illustrative boring tool 1 which has a borer body 3 having a shaft 2 arranged on one end. A substantially cylindrical end 4 is arranged opposite the shaft 2 on the boring tool on which are formed spanning grooves 5 that extend in a partial screw-like manner, with a rotation of, for example 45°, around the axis of rotation of the boring tool 1. On the face side of the boring tool, the cylindrical end 4 of the boring tool 1 is equipped with two plate seats 8, 9, on which first and second reversing cutting or cut plates 11, 12 are mounted. The first reversing cut plate 11 is mounted radially relatively further inside on the borer body and touches or overcuts the axis of rotation, while the second reversing cut plate 12 is arranged relatively further outside on the borer body and determines the bore diameter.

Figure 2:
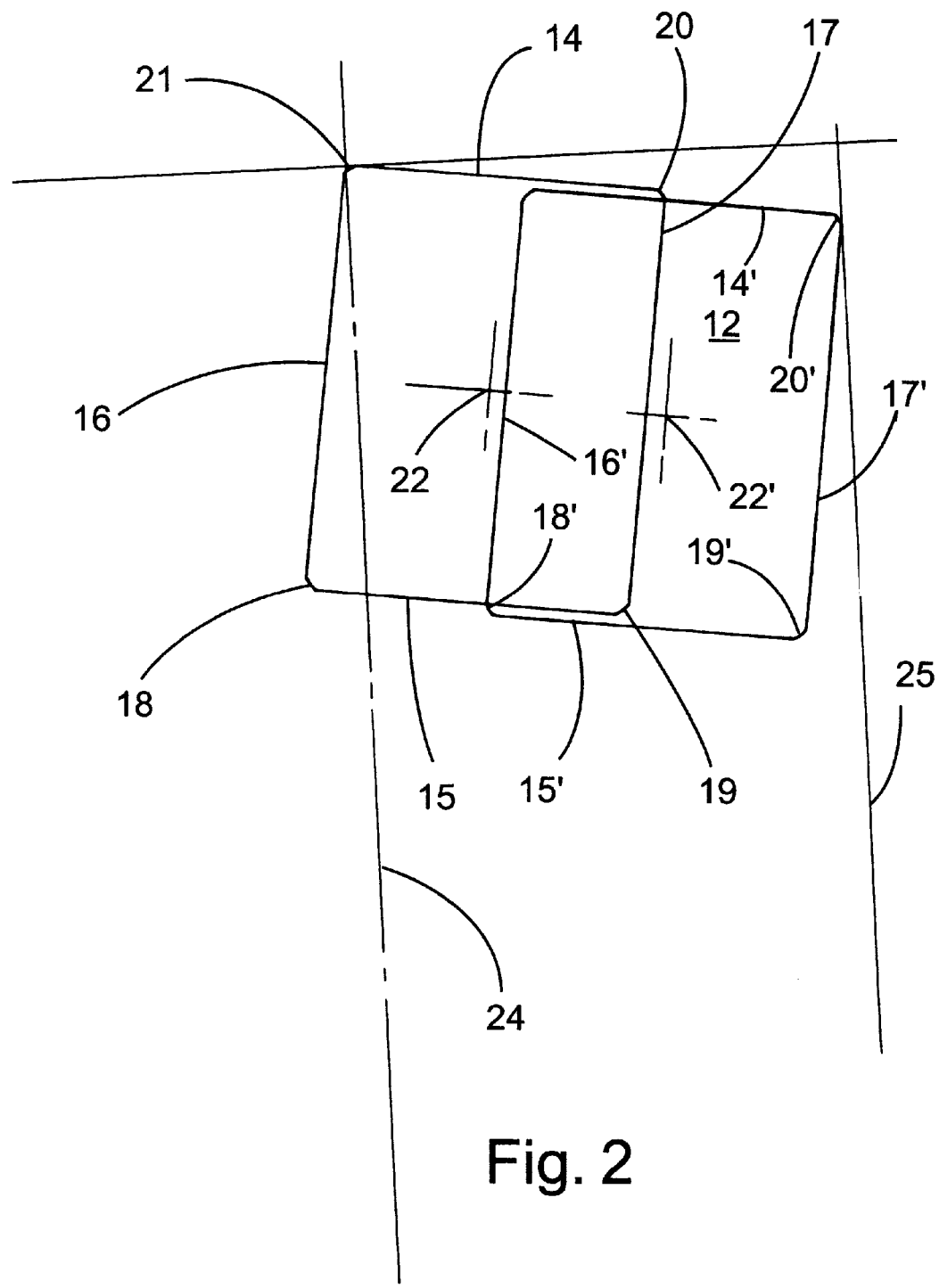
FIG. 2 is a schematic view of the illustrative boring tool showing the arrangement of the cut plates in the boring tool according to FIG. 1 projected over one another with the tilting with respect to the axis of rotation being represented in a greatly exaggerated manner.

In accordance with one aspect of the invention, the first and second reversing cut plates 11, 12, as is shown in FIGS. 3 to 7, have a rectangular construction. As shown in FIG. 2, which illustrates the first and second reversing cut plates 11, 12 projected over one another in the circumferential direction, the first reversing cut plate 11 includes two opposing and parallel short cutting edges 14, 15 and two longer cutting edges 16, 17, which also lie parallel to one another. At each corner, the cutting edges 14, 16', 16, 15', 15, 17', 17, 14 connect to one another with corresponding corner edges 18, 19, 20, 21. The corresponding cutting edges and corner edges are also found in the second reversing cut plate 12 which has an identical construction. The cutting edge and corner edges of the two cut plates are indicated with like reference numbers which are distinguished with an apostrophe. The cutting edges 14, 15, 16, 17 are constructed straight without any jogs or bends.

Both the first and second reversing cut plates 11, 12 have a central fastening bore 22, 22', which are shown in FIG. 2 exclusively via their center point. Each fastening bore 22, 22' is engageable by a clamping screw (not shown) with which the reversing cut plate 11, 12 is held against the plate seat.

The first and second rectangular reversing cut plates 11, 12 are oriented, as shown in an exaggeration manner in FIG. 2, essentially parallel to one another, with the corner cutting edge 20' of the radially outer reversing cut plate 12 defining the bore diameter and the corner edge 21 of the radially inner reversing cut plate 11 overlapping the axis of rotation 24 of the boring tool 1. The first reversing cut plate 11 is arranged axially farther forward on the boring tool, i.e. farther from the shaft 2 than is the second reversing cut plate 12. The active cutting edges 14, 14', i.e. the cutting edges arranged on the face side of the boring tool, of the pair of cut plates, however, are arranged substantially parallel to one another. With respect to the axis of rotation 24, the first and second reversing cut plates 11, 12 are somewhat tilted, so that the cutting edges 16, 16', which are clearly longer than the cutting edges 14, 14', enclose an acute angle with the axis of rotation 24, in the range of approximately 0.5 to approximately 3°. Preferably, this angle is established in the range from 1 to 2°. The same angle is enclosed by the cutting edge 17' with a bore wall 25.

Figure 2A:
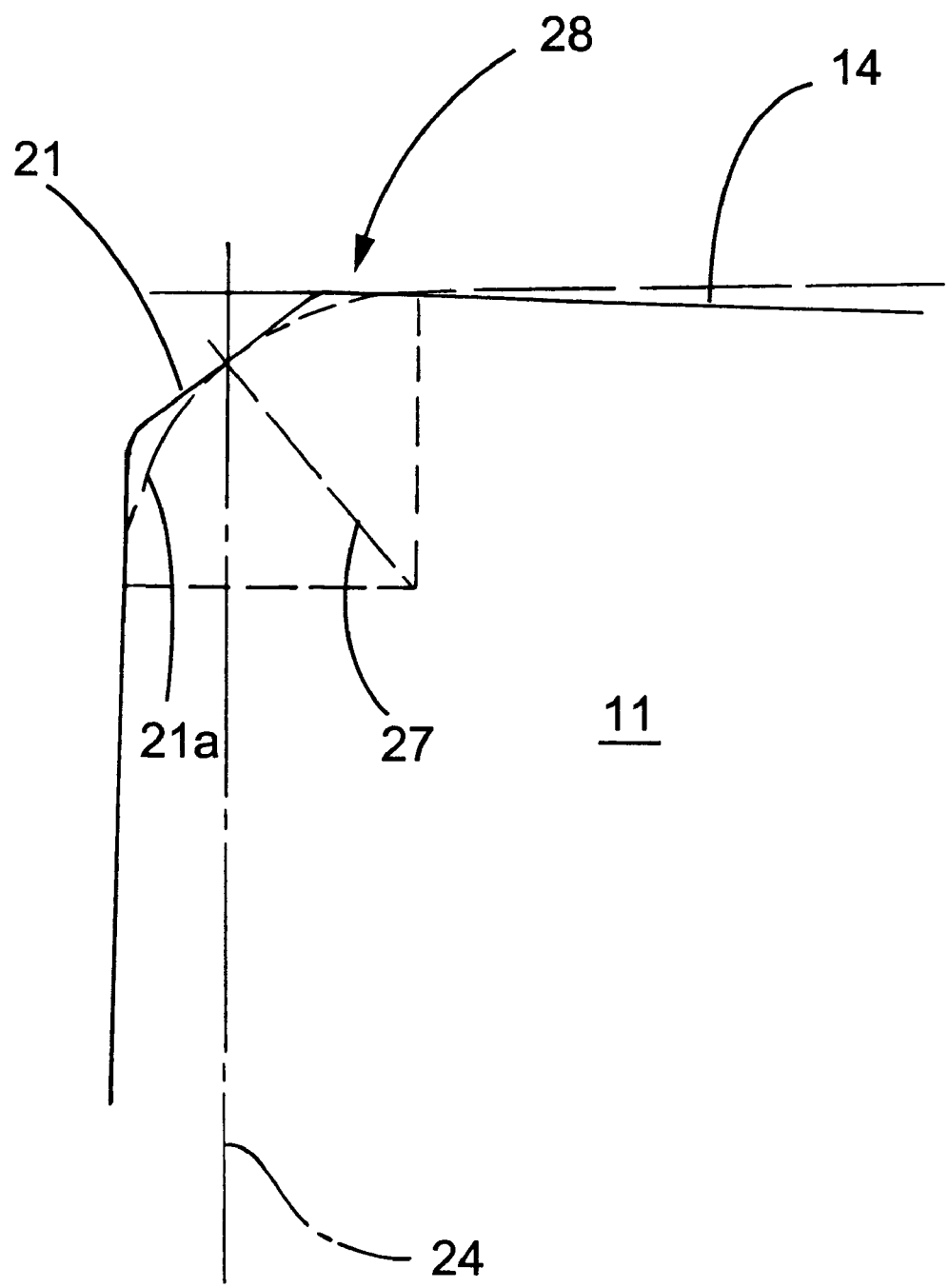
FIG. 2a is an enlarged schematic view of the arrangement of one of the cut plates of the illustrative boring tool.
Figure 4:
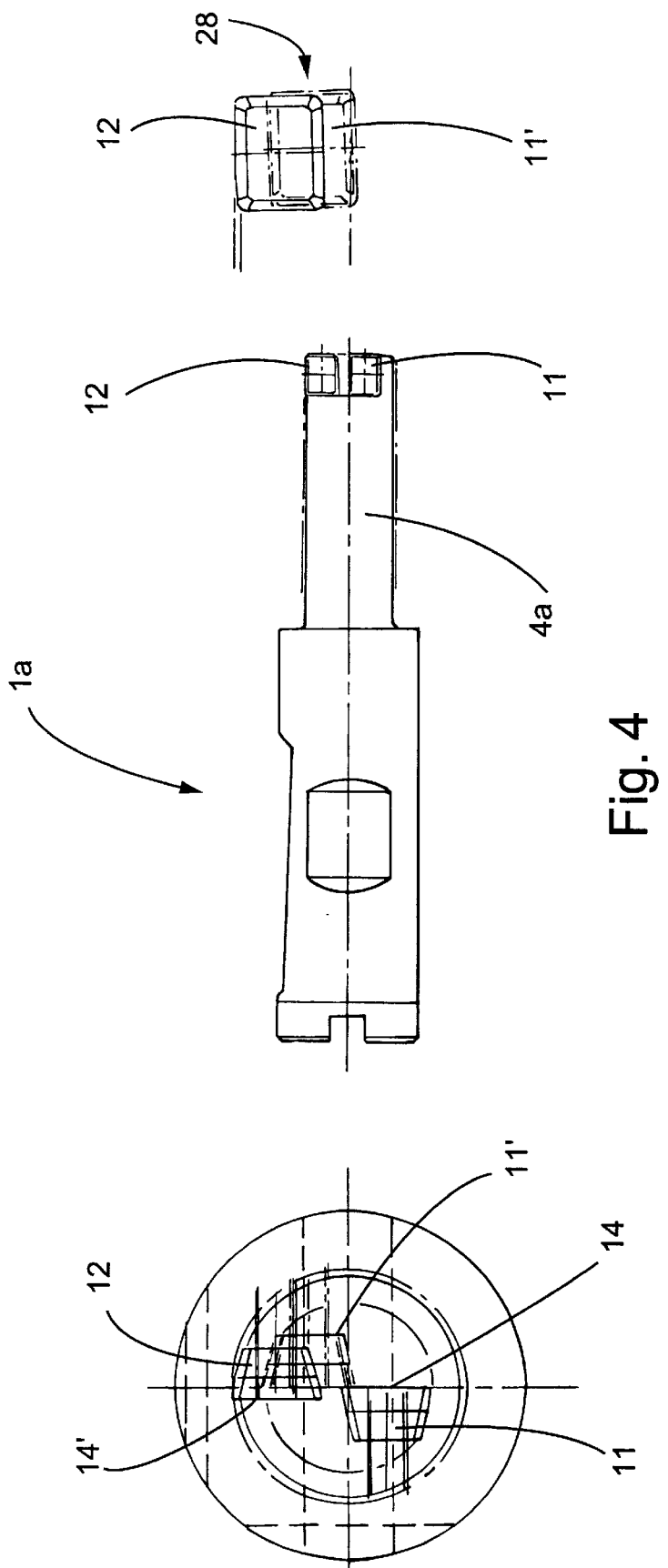
FIG. 4 is a schematic side elevation, cut plate projection and front elevation similar to FIG. 3 of a boring tool having a relatively larger diameter than the boring tool shown in FIG. 3.

As shown in FIG. 2a, the corner edge 21, as represented in the solid line, can be formed by a short straight piece. It is also possible, however, to construct the corner edge arcuately, as is represented with a broken line 21a in FIG. 2a. In any event, the first reversing cut plate 11 is arranged in such a way that the axis of rotation 24 passes the cut plate approximately in the area of or intersects the corner edge 21. Its middle area is defined essentially by the bisector angle 27 of the corner no matter what form is used for the corner edge. Through this arrangement of the corner and through the oblique setting of the first reversing cut plate 11 against the axis of rotation 24, as best shown in FIGS. 2 and 2a, the axially farthest forward arranged, highest intersection point 28 lies immediately in the transition area between the corner edge 21 and the active cutting edge 14.

The basic reversing cut plate geometry which is described above enables a set of boring tools to be constructed using the same cut plates, as shown in FIGS. 3 to 7. For example in the illustrated embodiment, the boring tool 1 of the set which has the smallest diameter, shown in FIG. 1, generates a bore diameter of approximately 10 mm, while the boring tool 1d having the largest diameter, shown in FIG. 7, delivers a bore diameter of somewhat more than 18 mm. The boring tools 1 to 1d of the set, the components of which are provided with the same reference letter suffixes, are distinguished, besides by their diameter, only through the formation of the plate seats 8, 9, and by the resulting orientation of the reversing cut plates 11, 12. However, uniform reversing cut plates 11, 12 are used for all the boring tools 1 to 1d in the set. As shown in FIG. 3, with the boring tool 1 in the set having the smallest diameter, the reversing cut plates 11, 12 are installed lengthwise and clearly overlap one another. As shown in the face view of FIG. 3, the radially inside-arranged first reversing cut plate 11 is arranged with its cutting edge 14 approximately in the middle of the tool or at the longitudinal or rotational axis of the tool, whereas the cutting plate 14' of the second reversing cut plate 12 is applied over the middle of the tool. This arrangement also applies, in principle, for the boring tool 1a in the set having a slightly larger diameter shown in FIG. 4. With the boring tool 1a, however, the overlapping between the reversing cut plates 11, 12 is somewhat less. In the schematic projection of the first and second reversing cut plates 11, 12, in FIG. 4, the first reversing cut plate 11 is represented in broken lines and is designated with the reference number 11'.

Figure 5A:
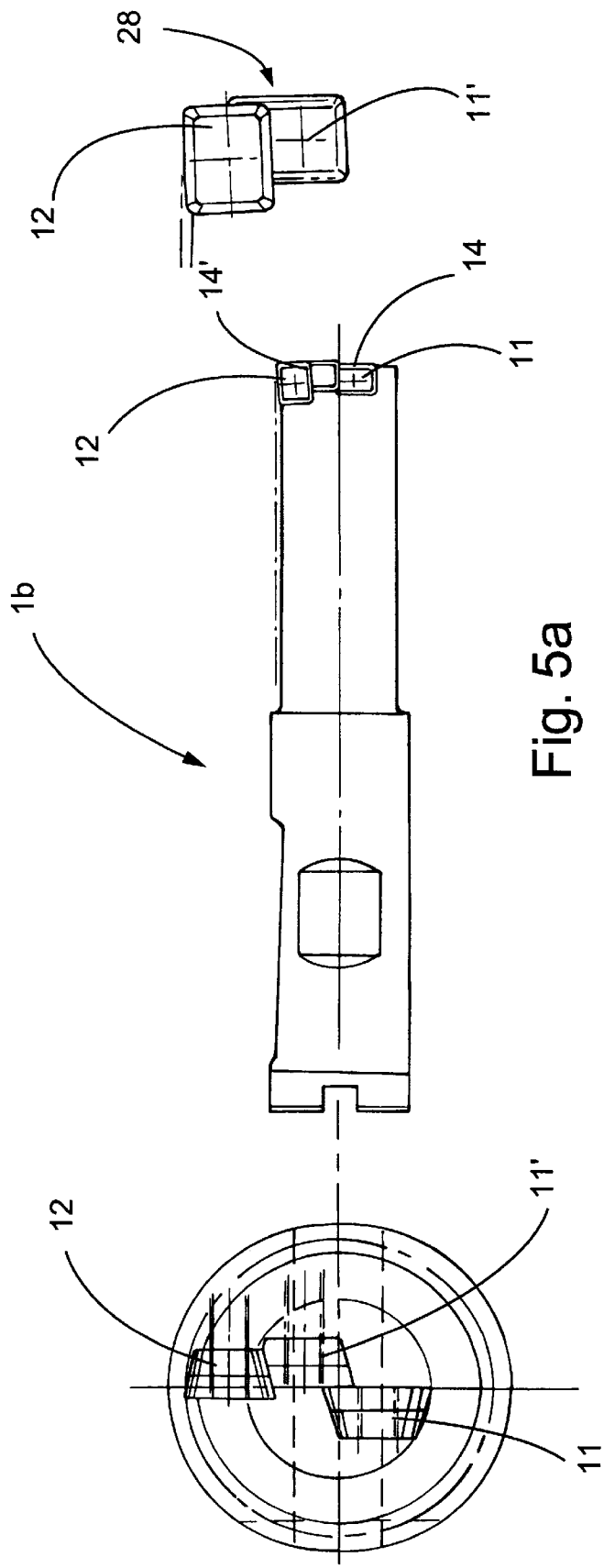
FIG. 5a is schematic side elevation, cut plate projection and front elevation similar to FIG. 3 of an alternative embodiment of the boring tool of FIG. 5 having one radially oriented cut plate and one axially oriented cut plate.
Figure 5B:
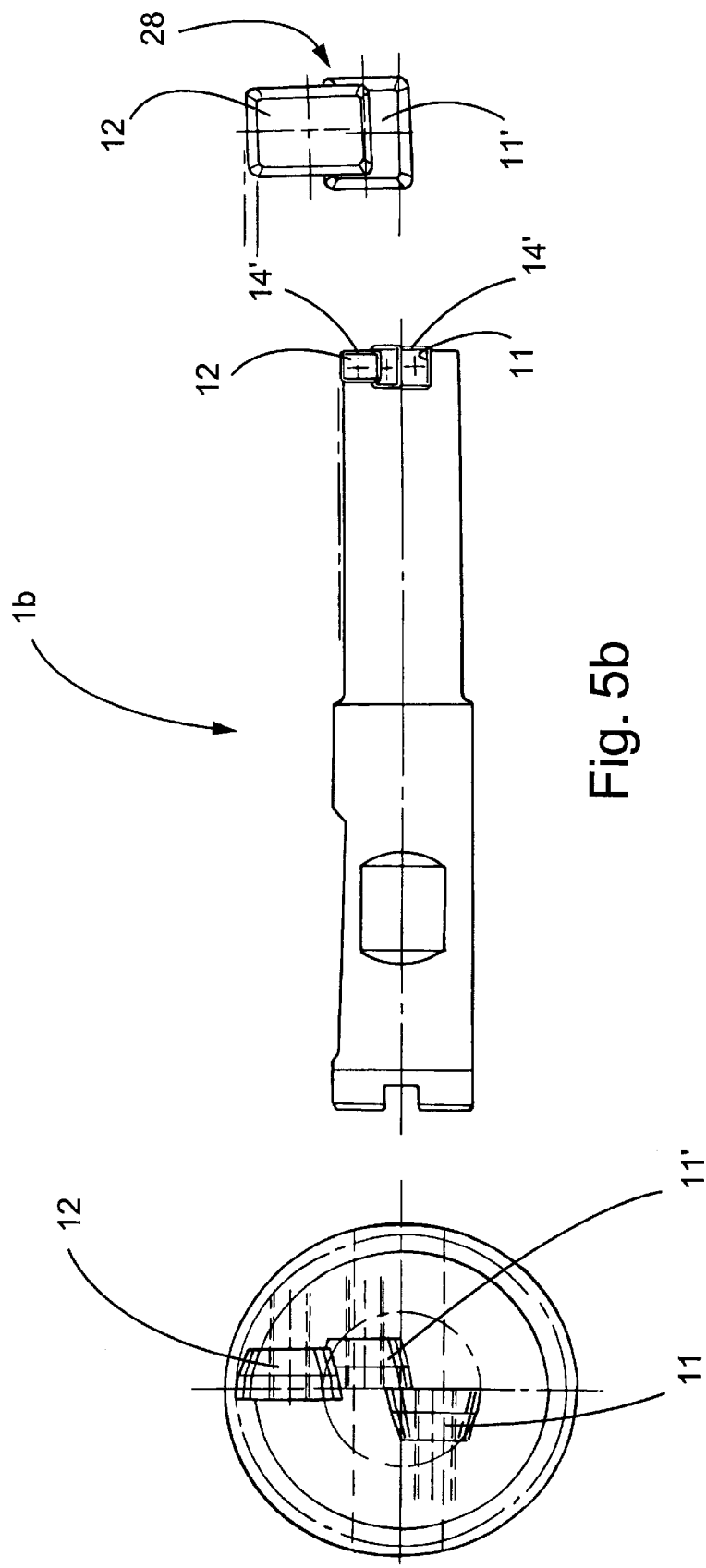
FIG. 5b is a schematic side elevation, cut plate projection and front elevation similar to FIG. 3 of another alternative embodiment of the boring tool of FIG. 5 having one radially oriented cut plate and one axially oriented cut plate.

The resulting overlapping area 29 of the first and second cut plates 11, 12 in the boring tool 1a is clearly smaller in comparison to the overlapping area 29 of the boring tool 1 having the next-smaller diameter. The overlapping zone 29 of the boring tool 1b represented in FIG. 5 is still further reduced. In this case, the two reversing cut plates 11, 12 are in engagement with the work piece over practically the entire length of their cutting edges 14, 14' with the full spanning thickness. Alternative arrangements of the boring tool 1b are illustrated in FIGS. 5a and 5b. With these alternative arrangements, a radially oriented cutting plate 11, 12 is, in each case, combined with an axially oriented cutting plate 12, 11.

Figure 6:
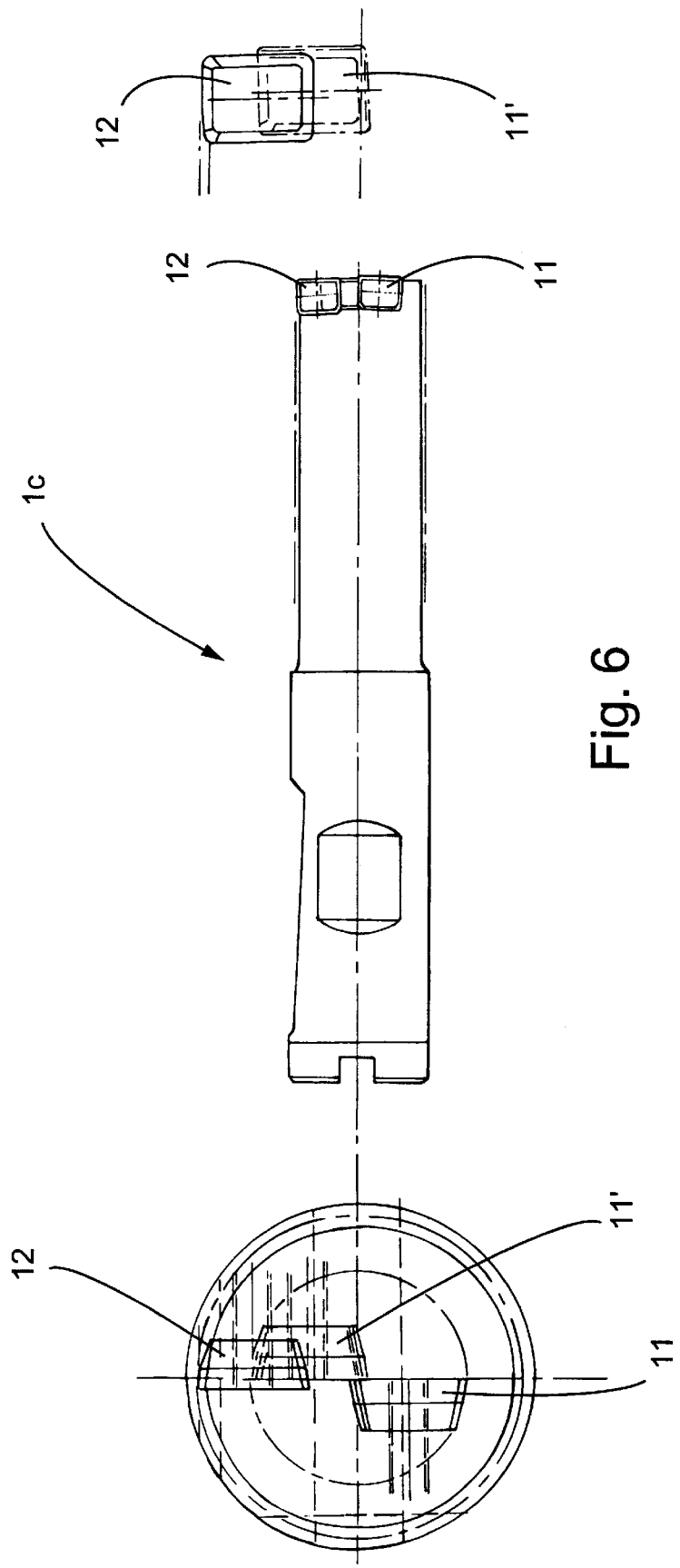
FIG. 6 is a schematic side elevation, cut plate projection and front elevation similar to FIG. 3 of a boring tool having a relatively larger diameter than the boring tool shown in FIG. 5 and having both cut plates arranged transversely.
Figure 7:
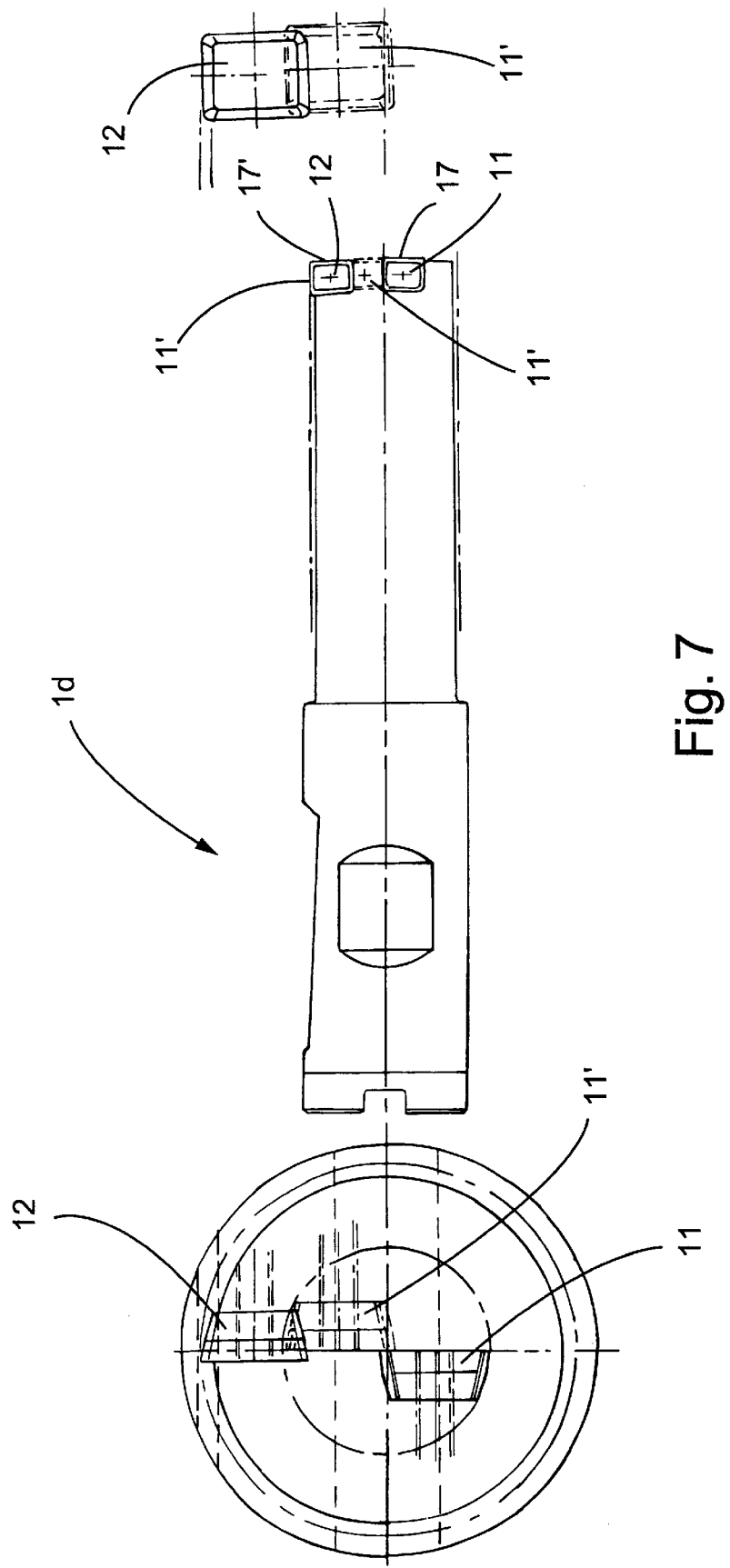
FIG. 7 is a schematic side elevation, cut plate projection and front elevation similar to FIG. 3 of a boring tool having a relatively larger diameter than the boring tool shown in FIG. 6 and having both cut plates arranged transversely.

With even larger borer diameters such as with the case of boring tools 1c and 1d illustrated in FIGS. 6 and 7, respectively, the reversing cut plates 11, 12 are no longer mounted lengthwise with respect to the boring tool but instead transversely. It will be appreciated that a combination of a lengthwise-installed reversing cut plate 11 with a transversely installed reversing cut plate 12 is also possible. When the reversing cut plate(s) 11, 12, are installed transversely their longer cutting edge is active, while their shorter cutting edge 14' forms the circumferential cutting edge. In order to reduce the required inventory and purchasing of cut plates to a minimum, all the boring tools 1 to id in the set are equipped with uniform reversing cut plate(s).

With use of the boring tool 1 of the present invention (as well as with tools 1a to 1d) advantageous cutting and force relations are produced as result of the rectangular geometry of the reversing cut plates and of the various possibilities in their position. The plate seat for the radially outward-arranged reversing cut plate 12 has an axial bearing surface for the reception of the axial forces acting on the reversing cut plate 12, as well as a large bearing surface for the base surface of the reversing cut plate and a lateral bearing surface. The plate seat has a geometrically simple configuration and can be produced economically with precision. It is possible therefore in a simple manner to achieve a precise support of the reversing cut plates 11, 12. The absorption of forces is good, particularly as a result of the relatively large distance between the fastening screw and the active cutting edge 14, 14' in the boring tools 1, 1a, 1b. Bending stresses on the reversing cut plate 12, which could lead to plate breakage in the area of the fastening bore, are also substantially reduced because of the distance between the fastening screw and the active cutting edge to levels where the bending stresses are absolutely non-dangerous. This is also the case for the transversely set rectangular reversing cut plates 11, 12 in the boring tools 1c, 1d shown in FIGS. 6 and 7. While the distance between the fastening screw and the active cutting edge 17, 17' is less with the boring tools 1c and 1d, once again the weakening of the reversing cut plate with respect to the bending stresses is correspondingly less because of the broad supporting of the reversing cut plates 11, 12, or because the bending stresses are distributed over a wider range.

In order to set-up the boring tool 1 (as well as 1a to 1d), the highest intersection point 28 shown in FIG. 2a is first brought in contact with the work piece surface which, in turn, draws a very narrow circle about the axis of rotation 24. During formation of a chip, the entire cutting edge 14, 17 immediately comes into engagement with the work piece and thereupon with the cutting edge 14' 17' of the radially farther-outwardly arranged second cutting plate 12.

Because of the axial setting of the two reversing cut plates 11, 12 with the inner reversing cut plate 11 being axially farther forward-lying, the reaction forces produced by the first reversing cut plate are greater than the essentially oppositely directed reaction forces of the outside-lying second reversing cut plate 12. Therefore, a radial force remains which as a result tends to deflect the borer shaft toward one side. This radial force rotating along with the borer brings about a defined loading of the boring tool 1 in a lateral direction and thus avoids an undefined state which tends to produce vibrations. Furthermore, it is possible therewith to achieve a slightly flexible deflection of the end 4 of the boring tool 1, whereby the bore diameter is slightly enlarged.

The corner edge 21 encircles the axis of rotation 24 with a narrow radius such that the corner edge 21 lifts off a chip without pressing while a needle or a pin of un-removed material remains standing coaxial to the axis of rotation 24. Preferably, the boring tool 1 is set in such a way that the corner edge 21 intersects the axis of rotation 24 when the boring tool 1 is at rest. As a result of the radial force arising in the boring, the boring tool 1 is deflected in such manner that the reversing cut plate 11 with its corner edge 21 is pressed away from the axis of rotation 24 and thus runs on a circle about the axis of rotation 28. When the boring tool 1 stands still, the cut plate moves back and the corner edge shears off any material that has possibly been left standing.

As a result of the slightly oblique position of the reversing cut plate 12, the cutting edge 17', shown in FIG. 2 as serving as the circumferential edge, stands in exclusive engagement with the bore wall by approximately 1" in the area adjoining the corner edge 20'. When the boring operation is completed, the borer body 3 of the boring tool 1 returns to its undeflected center position, resulting in the corner edge 20' and the cutting edge 17' becoming separated from the bore wall 25. Thus, the boring tool 1 can be removed from the bore without creating any furrows on the bore wall 25.

A boring tool 1 is provided with two rectangular reversing cut plates 11, 12, which, in each case, have two short cutting edges 14, 15 and two considerably longer cutting edges 16, 17. One of the reversing cut plate 11 is arranged connecting to or intersecting the axis of rotation 24 of the boring tool 1, while the other reversing cut plate 12 is arranged connecting to the outer circle defined by the boring tool 1. The particular cutting edges 14, 14', active on the face side of the boring tool, are constructed straight and they overlap to a greater or lesser extent depending on the bore diameter. The bend-free and jog-free construction of the active cutting edges 14, 14' makes possible the use of the same reversing cut plate 11, 12 on boring tools 1 with different diameters. Only the degree of overlapping must be changed with the cut relations remaining substantially unaltered. With respect to the prior art, smaller minimal diameters are possible, because the area around the bore of the reversing cut plate is determinative for the minimal plate size. The reversing cut plates are particularly simple and are installable over a greater diameter range. Furthermore, the reversing cut plates are particularly simple in construction. The force relations and directions are clear. The inner cutting edge is always in engagement with the work piece over its entire length.

What is claimed is:

1. A boring tool comprising:
   a substantially cylindrical borer body which is rotatable about an axis of rotation, the borer body having opposing blade and clamping ends,
   a tensioning shaft arranged on the clamping end of the borer body,
   a seat adapted to support a cut plate arranged adjacent the blade end of the borer body, and
   at least one reversing cut plate being mounted and supported in the cut plate seat, the reversing cut plate having a rectangular construction which includes four cutting edges that are straight over their entire length, each corner of the reversing cut plate being defined by the connection in perpendicular relation of one relatively longer and one relatively shorter cutting edge, wherein the reversing cut plate is positionable in the cut plate seat with either one of the relatively longer cutting edges or one of the relatively shorter cutting edges arranged on a face side of the borer body to define a face side cutting edge depending on the diameter of the borer body.

2. The boring tool according to claim 1 wherein the reversing cut plate includes a centrally located fastening bore which is engageable by a fastening screw.

3. The boring tool according to claim 1 wherein the borer body includes two plate seats and two reversing cut plates each being mounted in a respective one of the two plate seats, the reversing cut plates being arranged on the borer body in different radial positions such that the face side cutting edges of the two reversing cut plates partially overlap.

4. The boring tool according to claim 3 wherein the radially inwardly arranged reversing cut plate is arranged with its face side cutting edge on a line which intersects the axis of rotation of the borer body.

5. The boring tool according to claim 4 wherein the radially outwardly arranged reversing cut plate is arranged with its face side cutting edge on a line which does not intersect the axis of rotation of the borer body.

6. The boring tool according to claim 5 wherein the lines defined by the respective face side cutting edges of the two reversing cut plates extend approximately parallel to one another.

7. The boring tool according to claim 3 wherein the face side cutting edge of the radially inwardly arranged reversing cut plate is positioned farther from the clamping end of the borer body than the face side cutting edge of the radially outwardly arranged reversing cut plate.

8. The boring tool according to claim 3 wherein at least one of the reversing cut plates has a corner edge arranged adjacent the axis of rotation of the borer body and the plate seat of the at least one reversing cutting plate is adapted such that at least a portion of the corner edge extends beyond the axis of rotation.

9. The boring tool according to claim 8 wherein the axis of rotation of the borer body crosses the corner edge substantially centrally.

10. The boring tool according to claim 8 wherein the plate seat of the at least one reversing cut plate is adapted such that transition from the face side cutting edge to the corner of the at least one reversing cut plate defines a highest cutting point which is positioned axially further forward than any edge section which extends beyond the axis of rotation.

11. The boring tool according to claim 10 wherein the transition from the face side cutting edge to the corner edge forms the intersection point positioned axially farthest forward.

12. The boring tool according to claim 1 wherein the face side cutting edge of the reversing cutting plate is adapted such that its entire length is engageable with a work piece.

13. The boring tool according to claim 1 wherein the borer body includes a plurality of reversing cut plates all of which have a uniform rectangular construction.

14. A set of boring tools comprising a plurality of boring tools each of which includes:

a substantially cylindrical borer body which is rotatable about an axis of rotation, the borer body having opposing blade and clamping ends, a tensioning shaft arranged on the clamping end of the borer body, a seat adapted to support a cut plate arranged adjacent the blade end of the borer body, and at least one reversing cut plate being mounted and supported in the cut plate seat, the reversing cut plate having a rectangular construction which includes four cutting edges that are straight over their entire length, each corner of the reversing cut plate being defined by the connection in perpendicular relation of one relatively longer and one relatively shorter cutting edge, the reversing cut plate being positionable in the cut plate seat with either one of the relatively longer cutting edges or one of the relatively shorter cutting edges arranged on a face side of the borer body to define a face side cutting edge depending on the diameter of the borer body, wherein each of the plurality of boring tools has a different boring diameter and the respective cutting plates of each of the plurality of boring tools have an identical rectangular construction.

15. The boring tool set according to claim 14 wherein each boring tool includes two plate seats and two reversing cut plates each being mounted in a respective one of the two plate seats and the different boring diameters are produced by arranging the reversing cut plates on each of the boring tools in different radial positions on their respective borer bodies such that the face side cutting edges of the reversing cut plates of each boring tool overlap to a different extent.

16. The boring tool set according to claim 14 wherein at least one boring tool of the boring tool set has a plate seat which supports the reversing cut plate in such a position that one of the relatively longer cutting edges is the face side cutting edge.

17. The boring tool according to claim 14 wherein the borer body of each of the plurality of boring tools includes a plurality of reversing cut plates all of which have a uniform rectangular construction.

\* \* \* \* \*